United States Patent Office 3,385,860
Patented May 28, 1968

3,385,860
PROCESS FOR PREPARING LOWER ALKYL
2-PYRIDINIUM ALDOXIME SALTS
Richard Bennett Margerison, Florham Park, and John Archibald Nelson, Morris Plains, N.J., assignors to Ciba Corporation, New York, N.Y., a corporation of Delaware
No Drawing. Continuation-in-part of application Ser. No. 462,388, June 8, 1965. This application July 19, 1966, Ser. No. 566,222
16 Claims. (Cl. 260—296)

ABSTRACT OF THE DISCLOSURE

The invention involves a novel procedure for preparing lower alkyl 2-pyridinium-aldoxime salts, more particularly the 2-pyridine-aldoxime methohalides, such as the methochloride. The process involves mixing a lower alkyl 2-picolinium salt with an alkyl nitrite, adding a base material to the reaction mixture and finally neutralizing with an acid to obtain the desired product. The products produced by this procedure are anti-cholinesterase inhibitors.

This is a continuation-in-part of application Ser. No. 462,388, filed June 8, 1965, now abandoned, which is in turn a continuation-in-part of application Ser. No. 324,-226, filed Nov. 18, 1963, and now abandoned.

The present invention concerns a novel procedure for the preparation of lower alkyl 2-pyridinium-aldoxime salts, more particularly the 2-pyridine-aldoxime methohalides, especially the 2-pyridine-aldoxime methochloride (2-PAM chloride), which compounds are potent anti-cholinesterase inhibitors.

Procedures available for the preparation of these compounds either comprise the formation of picolinaldehyde, which is then converted into its oxime and the latter is quaternized with a reactive ester of a lower alkanol, or the formation of a lower alkyl 2-picolinium salt, its conversion into the corresponding base or anhydrobase, which is reacted with a nitrosating agent, such as a nitrosyl halide or an alkyl nitrite (U.S. Patent No. 3,155,674).

The former method, requiring picolinaldehyde, represents a cumbersome procedure involving many steps for isolation and purification of intermediates. The latter method, requiring the liberation of the tertiary bases or anhydrobases respectively, does not provide satisfactory yields and final products, since said bases are highly unstable compounds which cannot be handled without risk of considerable loss on a large scale basis.

We have now found that lower alkyl 2-pyridinium aldoxime salts can be prepared satisfactorily, especially in higher yields and of higher purity than according to the procedure illustrated in said U.S. patent, by (a) reacting a lower alkyl 2-picolinium salt with an aliphatic nitrite, advantageously in approximately a molar ratio, (b) adding to the reaction mixture a base, advantageously an equivalent amount of an alkali metal hydroxide at a temperature not exceeding room temperature and, (c) neutralizing the reaction mixture with an acid, advantageously a hydrohalic acid.

The aliphatic nitrite used in the present process is, more particularly, an alkyl nitrite, preferably a lower alkyl nitrite and advantageously a liquid lower alkyl nitrite, especially one containing 3 to 5 carbon atoms, such as isopropyl, n-butyl or preferably isopentyl (isoamyl) nitrite. It may also be a gaseous alkyl nitrite, such as ethyl nitrite, or a solid alkyl nitrite.

As mentioned above, the base used in the present process is preferably an alkali metal hydroxide, such as sodium or potassium hydroxide. Of course, one may obviously use a material which provides the alkali metal hydroxide, in situ, under the conditions of the reaction, such as an alkoxide of the alkali metal hydroxide. In addition, the base may be a quaternary ammonium hydroxide, such as a tetra-lower alkyl-quaternary ammonium hydroxide, (e.g., tetra-methyl ammonium hydroxide, tetra-ethyl ammonium hydroxide, etc.), a benzyl-tri-lower alkyl ammonium hydroxide (e.g., benzyl-tri-methyl ammonium hydroxide, benzyl-tri-ethyl ammonium hydroxide, etc.), or a similar organic base. The acid used is preferably a hydrohalic acid, (e.g., hydrochloric, hydrobromic or hydrohalic acid), e.g., hydrochloric or hydrobromic or hydrohalic acid as well as sulfuric or sulfonic acid or a strong organic acid, particularly a sulfonic acid such as a lower alkane or benzene sulfonic acid, e.g., methane, ethane, benzene, or p-toluene sulfonic acid or a monolower alkyl sulfate, e.g., methyl or ethyl sulfate. The acid may also be a lower alkane carboxylic acid, e.g., acetic acid, propionic acid, etc. or a halogenated-lower alkane carboxylic acid, e.g., trichloro-acetic acid, tribromo-acetic acid, tetrachloro-acetic acid and the like.

The process of this invention is carried out according to standard methods, advantageously in the presence of diluents, preferably such as are inert to the reagents and are solvents thereof, for example of water, of alcohols, such as lower alkanols, e.g., methanol, ethanol, isopropanol, n-butanol or isopentanol, of ketones, such as lower alkanones, e.g., acetone, or of mixtures thereof with or without water, of catalysts and/or inert atmospheres advantageously at low temperatures, for example in the range between 0° and room temperature, preferably between —10° and +10° C. for the nitrosation, at atmospheric or superatmospheric pressure.

The invention also comprises the modification of the process, wherein the aliphatic nitrite and the base are added simultaneously or wherein a compound obtainable as an intermediate at any stage of the process is used as starting material and any remaining steps are carried out, or the process is discontinued at any stage thereof, or in which the starting materials are formed under the reaction conditions.

Mainly those starting materials should be used that lead to the formation of those compounds indicated above as being the preferred embodiments of the invention.

The starting materials are known or, if new, may be prepared according to methods known per se.

The following examples are intended to illustrate the invention and are not to be construed as being limitations thereon. The temperatures are given in degrees centigrade.

EXAMPLE 1

To a stirred solution of 18.81 g. picolinium methobromide in 25 ml. methanol and 15 ml. water, 17.56 g. isoamyl nitrite are added and hereupon a solution of 8.0 g. sodium hydroxide in 12 ml. water and 10 ml. methanol within a half hour period while keeping the temperature at 5–10° and allowing the reaction mixture to stand for 2 days at 5°. Hereupon 10% aqueous hydrochloric acid is added to adjust the pH of about 4 and the mixture is concentrated in vacuo at 0–20°.

The solid residue (A) is leached twice with two 40 ml. portions of ethanol and upon concentrating the solution and cooling it, there are obtained 1.73 g. of crude product (B). Three extractions of the solid A with 30 ml. methanol each yield after concentrating and cooling another 14.34 g. of crude product (C). The combined products B and C are recrystallized from methanol with the aid of charcoal to yield 12.29 g. of 95% pure 2-pyridine aldoxime methobromide of the formula

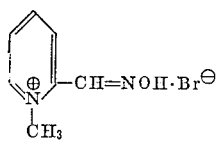

EXAMPLE 2

To a stirred solution of 14.37 g. picolinium methochloride in 25 ml. methanol and 15 ml. water, 15.5 g. n-butyl nitrite are added and hereupon a solution of 8.0 g. sodium hydroxide in 12 ml. water and 10 ml. methanol during about 15 minutes at 5–10°. After keeping the reaction mixture at 5° overnight, 10% aqueous hydrochloric acid is added to reach a pH of about 4 and the mixture is evaporated to dryness under reduced pressure at 0–20°.

The solid residue is washed twice with 40 ml. portions each of isopropanol and ethanol followed by three 40 ml. portions of warm methanol. Concentrating and cooling the methanol solution yields a first crop of 5.63 g. of 95% pure product. Further concentrating the mother liquor followed by the addition of acetone and diethyleneglycol dimethyl ether gives a second crop of 7.32 g. of 90–95% pure product and a second treatment a third crop of 1.36 g. of 60–70% pure product. The combined crops are recrystallized from methanol followed by the addition of acetone and yield a (1) crop of 2.30 g. of 95% pure, a
(2) crop of 2.62 g. of 95% pure and
(3) crop of 7.24 g. of 90–95% pure 2-pyridine aldoxime methochloride of the formula

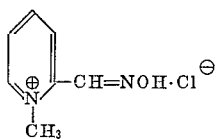

EXAMPLE 3

Following the procedure shown in Example 2 but using instead of n-butyl nitrite 17.56 g. isoamyl nitrite, there are obtained after the two recrystallizations from methanol-acetone 3 crops of totally 10.63 g. 2-pyridine aldoxime methochloride having a purity of about 95%.

EXAMPLE 4

A 5 liter flask is charged with 866.1 g. picoline methochloride solution containing 3 moles thereof (prepared as described below). To this stirred solution 666 ml. methanol are added and after cooling to 10° 368 g. isoamyl nitrile are added and cooling is continued until the temperature of 0° is reached. Hereupon a solution of 377 g. 50% aqueous sodium hydroxide in 120 ml. water and 300 ml. methanol is added at such a rate that the reaction temperature does not exceed 10°. The mixture is stirred at 0° for 4 hours and stored in the refrigerator overnight. The following morning the batch is neutralized to a pH of about 4 with about 320 ml. concentrated hydrochloric acid while keeping the temperature below 10°. The mixture is concentrated in vacuo to about 1 liter while maintaining the temperature below 35°. The semicrystalline residue is diluted with 1 liter isoamyl alcohol and vacuum distillation is continued until about 1 liter remains. This is repeated once more in order to remove water azeotropically. The residue is cooled to −10° overnight, filtered and sucked dry on the funnel. The filter cake is washed first with two 250 ml. portions of isopropanol and then with two 250 ml. portions acetone and is dried in vacuo at 50°. The so-obtained 600 g. brown cake is refluxed with 2 liter 0.5 N methanolic hydrochloric acid and 30 g. charcoal for 15 minutes, then filtered and the residue washed twice with 100 ml. portions of 0.5 N methanolic hydrochloric acid.

The filtrate is cooled to 0° overnight and the precipitated pyridine aldoxime methochloride filtered off and washed twice with 200 ml. portions of acetone and dried in vacuo at 50°; yield 256 g. The filtrate and washings are concentrated to about 300 ml. in vacuo and the residue cooled to 0° yielding a second crop of 21.1 g. of the same material.

Both crops are combined and dissolved in 1650 ml. boiling 0.5 N methanolic hydrochloric acid and 27.7 g. charcoal are added. The mixture is stirred and refluxed for 15 minutes, then filtered and the residue washed with 277 ml. 0.5 N methanolic hydrochloric acid. The filtrate and wash is concentrated at reduced pressure to 1500 ml. and cooled to 0° overnight. The precipitate is filtered off and washed once with 250 ml. isopropanol and once with 250 ml. acetone; yield 244 g. first crop and 23.4 g. second crop (from 300 ml. mother liquors).

The first crop (244 g.) is dissolved in 195 ml. deionized water at 30° and the solution stirred for 15 minutes with 12.3 g. charcoal and filtered. The residue is washed twice with each 12 ml. water and the filtrate diluted with 540 ml. isopropanol. It is cooled to −10° overnight, the precipitate formed filtered off, washed once with 250 ml. isopropanol and once with 250 ml. acetone and dried in vacuo at 50°; yield 202 g. pyridine aldoxime methochloride melting at 225° with decomposition. This product meets the specifications for preparing injectable solutions. A second crop of 35.8 g. is obtained by stripping the mother liquors to near dryness and adding 100 ml. isopropanol.

Both second crops (59.2 g.) require two crystallizations, one from methanolic hydrochloric acid and one from isopropanol water to yield the above pure product in about the same proportion.

The starting material can be obtained as follows:

A 1 gallon Sutherland reactor is charged with 931.3 g. 2-picoline and 150 ml. water. It is sealed, flushed first with nitrogen and then with methyl chloride. The mixture is heated to 100–103° with stirring and then the internal pressure is adjusted to 20 p.s.i.g. with methyl chloride. The reaction is allowed to progress until no further uptake of methyl chloride can be noticed. The reactor is purged of excess methyl chloride, the mixture diluted with 1 liter water and blown from the reactor with nitrogen. The reactor is washed with 350 ml. water and the wash is added to main batch. This aqueous solution of 2-picolinium methochloride is used in the above reaction. When titrated with standard mercuric nitrate using diphenyl carbazone as indicator it contains the product in an amount corresponding to 94% of theory calculated from the ionizable chloride content.

A 5 liter flask with efficient stirrer is charged with 440.8 g. isoamyl alcohol, cooled to 10°, and 260 g. technical sulfuric acid in 1100 ml. water are added in such a rate that the temperature maintains below 15°. The resulting emulsion is cooled to 0° and a solution of 380 g. sodium nitrite in 2.5 liter water is added at a temperature between −1 and 1°. It is stirred at 0° for one hour and then the organic layer is allowed to separate. It is collected, dried over 50 g. magnesium sulfate, filtered and stored at 0–5°; it represents the isoamyl nitrite used in the above reaction.

EXAMPLE 5

A two liter round-bottomed flask is charged with 304 ml. of a 1-molar aqueous solution of 2-picoline methochloride and 322 ml. n-butanol whereupon 108.3 g. n-butyl nitrite are added. The solution is stirred and cooled in an ice salt bath to 0° and a solution of 1253 g. 50% aqueous sodium hydroxide in 40 ml. water is added while maintaining the temperature between −1 and 1°. The batch is stirred for 3 hours and stored at −10° overnight. The following morning it is acidified to pH 4 by the addition of about 120 ml. concentrated hydrochloric acid, while maintaining the temperature near 0°. The reaction mixture is concentrated to about half the original volume at aspirator pressure, the residue is diluted with 250 ml. n-butanol and again concentrated to half the volume. This is repeated twice more and the final concentration is carried to the point where no additional water distills over. The suspension obtained is cooled to −10° while standing overnight. The crude 2-pyridine aldoxime methochloride and sodium chloride is filtered off and dried in vacuo at 60° C. to yield 244.5 g.

The salt cake obtained is stirred with 660 ml. methanol and the slurry is heated to reflux. The suspension is treated with 10 g. charcoal and clarified by filtration. The filter cake is washed with 100 ml. of hot methanol and the filtrate and wash is concentrated to 290 ml. at atmospheric pressure. The solution is cooled to −10° C. and the precipitate is filtered off and washed with two 50 ml. portions of methanol at −10° and dried in vacuo at 60°. Yield 128.6 g. of a first crop melting at 219° (dec.) and 13.2 g. of a second crop melting at 214° (dec.) by concentrating the mother liquors to 80 ml. Both crops are dissolved in 780 ml. boiling methanol, treated with 9.75 g. charcoal and clarified by filtration. The filter cake is washed with 150 ml. hot methanol and the total filtrate is concentrated to 390 ml. at atmospheric pressure. The slurry is cooled to −10° and the precipitate collected on a funnel. The filter cake is washed with two 50 ml. portions of methanol at −10° C. and dried in vacuo at 60° C. Yield: Crop I=123.5 g., Crop II=14.35 g.

Crop I is dissolved in 98 ml. water at 40° C., treated with 6.2 g. charcoal and clarified by filtration. The filter cake is washed with two 6 ml. portions of water and the filtrate and washes are diluted with 440 ml. isopropanol. The slurry is cooled to −10° and the pure 2-pyridine aldoxime methochloride is collected on a funnel, washed with two 50 ml. portions of isopropanol and dried in vacuo at 60°. Yield 102 g. of the first crop melting at 224° (dec.), and Crop II=17.45 g.

The combined second crops from the methanol and aqueous isopropanol purification steps are purified twice in the same manner and yield an additional 10% of pure 2-pyridine aldoxime methochloride melting at 224° (dec.).

What is claimed is:

1. The process for the preparation of lower alkyl 2-pyridinium-aldoxime salts which comprises
   (a) mixing a lower alkyl 2-picolinium salt with an alkyl nitrite,
   (b) adding to the reaction mixture a base selected from the group consisting of an alkali metal hydroxide, a tetra-lower alkyl quaternary ammonium hydroxide and a benzyl-tri-lower alkyl quaternary ammonium hydroxide, and
   (c) neutralizing the reaction mixture with an acid selected from the group consisting of a hydrohalic acid, sulfuric acid, phosphoric acid, a lower alkane sulfonic acid, a benzene sulfonic acid, a lower alkane carboxylic acid and a halogenated-lower alkane carboxylic acid.

2. Process as claimed in claim 1, wherein a methyl 2-picolinium halide is used as the lower alkyl 2-picolinium salt starting material.

3. Process as claimed in claim 2, wherein 2-picolinium methochloride is used as the methyl 2-picolinium halide.

4. Process as claimed in claim 1, wherein a liquid lower alkyl nitrite is used as the alkyl nitrite reactant.

5. Process as claimed in claim 4, wherein a member selected from the group consisting of isopropyl, n-butyl and isoamyl nitrite is used as the liquid alkyl nitrite.

6. Process as claimed in claim 1, wherein an alkali metal hydroxide is used as the base.

7. Process as claimed in claim 6, wherein a member selected from the group consisting of sodium and potassium hydroxide is used as the alkali metal hydroxide.

8. Process as claimed in claim 1, wherein a hydrohalic acid is used as the acid.

9. Process as claimed in claim 8, wherein hydrochloric acid is used as the hydrohalic acid.

10. Process for the preparation of methyl 2-pyridinium-aldoxime halides which comprises
    (a) mixing a methyl 2-picolinium halide with a liquid alkyl nitrite containing 3 to 5 carbon atoms in about a molar ratio,
    (b) adding to the reaction mixture an equivalent amount of an alkali metal hydroxide at a temperature not exceeding room temperature and
    (c) neutralizing the reaction mixture with a hydrohalic acid.

11. Process as claimed in claim 10, wherein methyl 2-picolinium chloride is used as the methyl 2-picolinium halide.

12. Process as claimed in claim 10, wherein a member selected from the group consisting of isopropyl, n-butyl and isoamyl nitrite is used as the liquid alkyl nitrite.

13. Process as claimed in claim 10, wherein sodium hydroxide is used.

14. Process as claimed in claim 10, wherein hydrochloric acid is used as the hydrohalic acid.

15. Process as claimed in claim 1, wherein the reaction is carried out between −10 and +10° C.

16. Process as claimed in claim 1, wherein the aliphatic nitrite and the base are added simultaneously.

References Cited

UNITED STATES PATENTS

| 2,816,113 | 12/1957 | Wilson et al. | 260—296 |
| 3,150,135 | 9/1964 | Forman | 260—296 |
| 3,155,674 | 11/1964 | McDowell | 260—296 |

OTHER REFERENCES

Kirk-Othimer Encyclopedia of Chemical Technology, vol. 9 (1952) Interscience, pp. 696–7.

JOHN D. RANDOLPH, *Primary Examiner.*

WALTER A. MODANCE, *Examiner.*

A. L. ROTMAN, *Assistant Examiner.*